(12) United States Patent
Strassenburg-Kleciak et al.

(10) Patent No.: US 8,253,724 B2
(45) Date of Patent: Aug. 28, 2012

(54) TERRAIN MODELING BASED ON CURVED SURFACE AREA

(75) Inventors: Marek Strassenburg-Kleciak, Hamburg (DE); Hendrik Meyer, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 835 days.

(21) Appl. No.: 11/943,892

(22) Filed: Nov. 21, 2007

(65) Prior Publication Data

US 2008/0246758 A1  Oct. 9, 2008

(30) Foreign Application Priority Data

Dec. 1, 2006 (EP) ..................................... 06024937

(51) Int. Cl.
*G06T 15/00* (2011.01)
(52) U.S. Cl. ........ 345/419; 345/420; 345/423; 345/427; 345/442; 715/702; 715/757
(58) Field of Classification Search .................. 345/419, 345/420, 423, 427, 442; 715/702, 757
See application file for complete search history.

(56) References Cited

U.S. PATENT DOCUMENTS

| | | | | |
|---|---|---|---|---|
| 7,245,299 B2 * | 7/2007 | Sfarti | ............... | 345/423 |
| 7,280,108 B2 * | 10/2007 | Sfarti | ............... | 345/423 |
| 7,812,839 B2 * | 10/2010 | Chu et al. | ............... | 345/442 |
| 2004/0027344 A1 | 2/2004 | Ohto | | |
| 2006/0227130 A1 * | 10/2006 | Elchuri | ............... | 345/419 |
| 2010/0271371 A1 * | 10/2010 | Chang et al. | ............... | 345/427 |

FOREIGN PATENT DOCUMENTS

| | | |
|---|---|---|
| JP | 10-207351 A | 8/1998 |
| JP | 2000-029384 A | 1/2000 |
| JP | 2003-242588 A | 8/2003 |

OTHER PUBLICATIONS

D J Walton, "Terrain modeling with B-spline type surfaces defined on curved knot lines," 0262-8856/87/01037-07, Butterworth & Co. (Publisher) Ltd. 1987, 7 pages.
Groger et al., "How to Get 3-D for the Price of 2-D—Topology and Consistency of 3-D Urban GIS," GeoInformatica vol. 9, No. 2, Springer Science + Business Media, Inc., The Netherlands, 2005, pp. 139-158.
Changqing Z. et al., "DTM Interpolation model based on non-uniform B-splines," Journal of Huazhong University of Science and Technology, Huazhong Ligong Daxue Chubanshe, Wuhan, CN, vol. 34, No. 4, Apr. 2006, pp. 45-48.
Anonymous, "Entfernen kolinearer Stutzstellen," May 22, 2003, One page. Retrieved from the Internet URL: /http://www.aquaplan.de/public_papers/zr/sectionKolinearZR.html.
Li, Yinguo, et al.: Digital Terrain Modelling in GIS and Method for Associate Function; Jun. 30, 1994; OA1 Reference Document 3; 7pp.

* cited by examiner

Primary Examiner — Phu K Nguyen

(57) ABSTRACT

A terrain modeling system provides a terrain model having variable resolution. The system receives an input terrain made up of raster points. The system identifies raster points that differ in height from an adjacent raster point by a threshold. The system interpolates the identified raster points to calculate one or more B-spline surfaces. The surfaces correspond to a multi-dimensional representation of a physical terrain.

22 Claims, 9 Drawing Sheets

TERRAIN MODELING BASED ON CURVED SURFACE AREA

PRIORITY CLAIM

This application claims the benefit of priority from European Patent Application No. 06024937.2, filed Dec. 1, 2006, which is incorporated by reference.

BACKGROUND OF THE INVENTION

1. Technical Field

The inventions relate to digital maps. In particular, the inventions relate to multi-dimensional terrain modeling.

2. Related Art

A navigation system may use digital maps to display streets, buildings, rivers, and other features. Three-dimensional maps may provide terrain slope, directions of slope, terrain profiles between selected points, and information related to a physical terrain.

The resolution of a digital map may affect the demand for electronic resources including demand for storage space and processor capabilities. A higher resolution map may require significant storage and processing resources. Use and/or management of digital maps may be limited by embedded systems, such as vehicle navigation systems, that have limited processing and memory resources. Modification made to a digital map to accommodate limited computer resources may affect the quality of the digital map. Therefore, a need exists for terrain modeling systems that provide an accurate and efficient manner to generate a high quality digital map.

SUMMARY

A terrain modeling system provides a terrain model having variable resolution. The system receives an input terrain made up of raster points. The system identifies raster points that differ in height from an adjacent raster point by a threshold. The system interpolates the identified raster points to calculate one or more B-spline surfaces. The surfaces correspond to a multi-dimensional representation of a physical terrain.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

A terrain modeling system based on curved surfaces provides quality terrain models with variable resolution. A digital model of a physical terrain may be obtained. The system identifies raster points that may include a height value that differs from a height value of at least one adjacent raster point. The raster points may be interpolated to derive one or more B-spline surfaces. The system may manually or automatically adjust the resolution of the B-spline surfaces based on available storage space, processing capabilities, desired detail, and/or other considerations. The B-spline surfaces may display a representation of the terrain. The system may be implemented in, or provide the calculated B-spline surfaces to, a handheld, vehicle, or other navigation system to provide efficient and accurate rendering of maps, such as three-dimensional maps.

Figure 1:
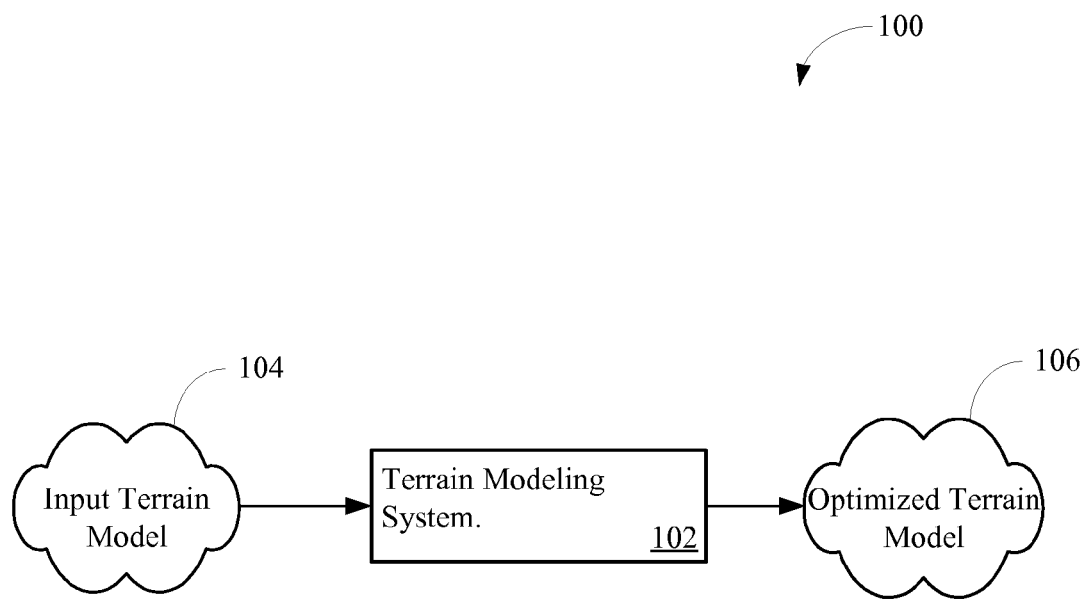
FIG. 1 is a flow diagram of an exemplary terrain modeling system.

FIG. 1 is a flow diagram 100 of an exemplary terrain modeling process 100. A terrain modeling system 102 obtains an input terrain model 104. The system 102 may obtain the input terrain model 104 from local, federal, and/or foreign government sources, from commercial providers, or from remote sources. The input terrain model 104 may be a digital graphical representation of a physical terrain or topographical surface that may be generated by a laser-scanning system.

The input terrain model 104 may comprise a three-dimensional model that may include raster points characterized by 3-D coordinate values. The 3-D coordinate values associated with each raster point may include a height coordinate that may be used to obtain a height value of the respective raster point. The terrain modeling system 102 may reduce the number of raster points used to model the physical terrain. The system 102 identifies raster points of the input terrain model 104 with height values that may differ, by less than a threshold difference, from the height values of at least one adjacent raster point. The system 102 may store the remaining raster points in a local or remote memory. The terrain modeling system 102 interpolates between the identified raster points to derive three-dimensional B-spline surfaces that may correspond to an optimized terrain model 106. The stored raster points may be the control points of the B-spline surfaces.

The terrain modeling system 102 may store in a memory and/or display the B-spline surfaces. The terrain modeling system 102 may transmit the B-spline surfaces to a display or to a navigation, mapping, or other system that use terrain information.

Figure 2:
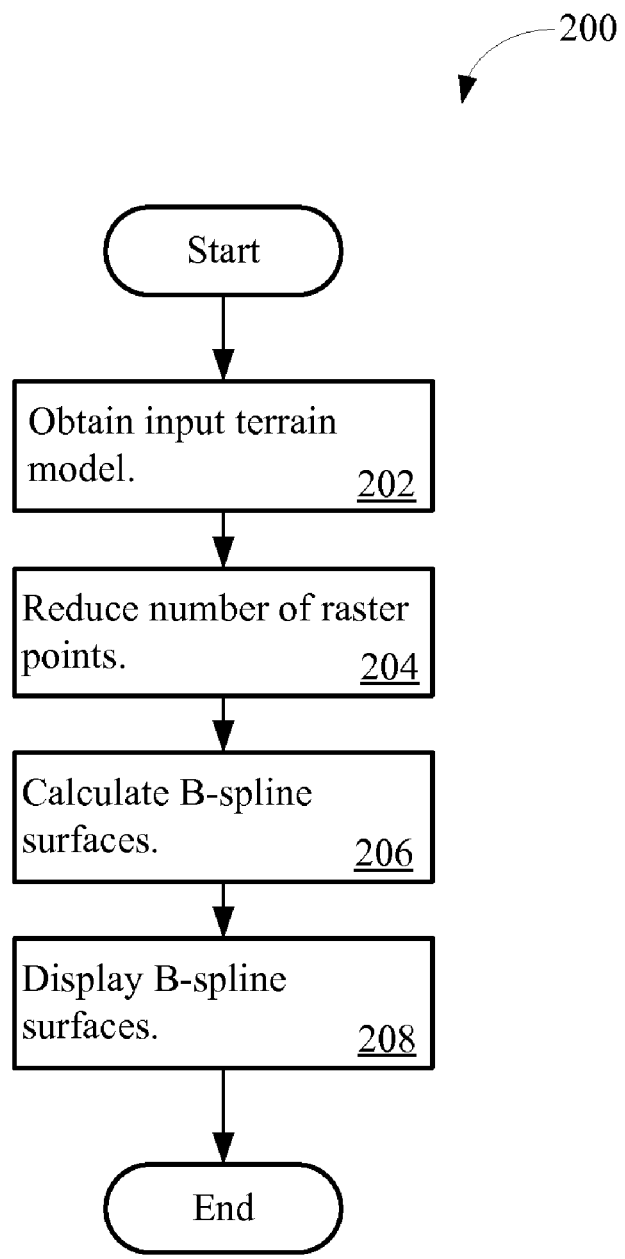
FIG. 2 is an exemplary terrain mapping process that may generate a digital representation of a physical terrain.

FIG. 2 is an exemplary process 200 that may generate a digital representation of a physical terrain. The process 200 obtains an input terrain model (Act 202). The input terrain model may be obtained from local and federal government sources, such as the United States Department of Commerce, from European administrative and governmental departments, from commercial providers, or from other terrain model providers. The input terrain model may comprise a laser-scanned digital model.

The input terrain model may include data representing coordinate values of raster points that correspond to a digital representation of the physical terrain. The raster points may be represented by three-dimensional coordinate values, including a height coordinate. The raster point may be characterized by a weight coordinate or weighting factor.

A height value may be associated with each raster point. The height value may represent the height difference between the raster point and a reference point. The reference point may be, for example, the lowest raster point of the input terrain model. Obtaining the input terrain model may include reading or storing in a local or remote memory the raster points of the input terrain model, as well as the respective height values of the raster points.

The process 200 analyzes the raster points to reduce the number of raster points of the input terrain model to a set of identified raster points (Act 204). The set of identified raster points may be a subset of the raster points of the input terrain model. The process 200 may compare the height values of adjacent raster points. An identified raster point may be a raster point whose height value differs from at least one of its adjacent raster points by less than a difference threshold.

The process 200 derives three-dimensional B-spline surfaces by interpolating the identified raster points (Act 206). The identified raster points by B-spline surfaces may be obtained from height values associated with the identified raster point.

A B-spline may denote a function defined piecewise by polynomials. Each spline function of a given degree, smoothness, and domain partition may be expressed as a linear combination of B-splines of that same degree and smoothness. B-splines may be evaluated by the Cox-de Boor algorithm. For a given non-decreasing sequence of m−1 knots $t_i$ (where i=0, ..., m), a B-spline of a degree n is a parametric curve comprises $$C(t) = \sum_{i=1}^{m} P_i b_{i,n}(t),$$

where $P_i$ are control points and $b_{i,n}$ are basis functions defined by the recursion $$b_{i,0}(t) = \begin{cases} 1, & \text{if } t_i \le t \le t_{i-1} \\ 0, & \text{else} \end{cases}$$

$$b_{i,n}(t) = \frac{t - t_i}{t_{i+n} - t_i} b_{i,n-1}(t) + \frac{t_{i+n+1} - t}{t_{i+n+1} - t_{i+1}} b_{i+1,n-1}(t).$$

The basis functions $b_{i,n}$ may be positive or negative. The curve may be contained in the convex hull of its control points. This may occur when the basis functions $b_{i,n}$ have the same sign. When the knots $t_i$ are equidistant, the B-splines may be uniform B-splines. The basis functions $b_{i,n}$ determine how strongly control points $P_i$ influence the curve. The process 200 may use the identified raster points as the control points $P_i$. Alternatively, a distance of the identified raster points to corresponding points of the three-dimensional B-spline surfaces may be minimized.

The process 200 may identify the height value corresponding to the lowest raster point of the input terrain model as a reference value. The height values of the identified raster points may be identified as differences to the reference value to minimize any storage space used by the process 200 and provide an efficient calculation of the interpolating B-spline surfaces.

The three-dimensional B-spline surfaces may be calculated such that the squares of the Euclidean distances of the stored raster points to their corresponding points on the B-spline surfaces are minimized. For example, for raster points $P_{j,k}$ with heights $h_{j,k}$, the B-spline surfaces Q(s,t) can be calculated to fulfill the condition $$\sum_{i=0}^{m} \sum_{j=0}^{l} |Q_{s_j,t_i} - h_{j,k}|^2 \to \text{Minimum}.$$

Such a least square approach may improve the accuracy of the digital representation of the physical terrain without necessarily identifying the raster points with knots or control points.

When the number of knots $t_i$ equals the degree of the B-spline, the latter may represent a Bezier curve. The process 200 may use a constant B-spline with $b_{i,n}$ chosen as $b_{i,0}$ or a linear B-spline, where $$b_{i,1}(t) = \begin{cases} \dfrac{t - t_i}{t_{i+1} - t_i}, & \text{if } t_i \le t \le t_{i+1} \\ \dfrac{t_{i+2} - t}{t_{i+2} - t_{i+1}}, & \text{if } t_{i+1} \le t \le t_{i+2}. \\ 0, & \text{else.} \end{cases}$$

The process 200 may use uniform quadratic and uniform cubic B-splines. Uniform quadratic splines are calculated in matrix form for the i+1-th segment of the curve C by $$C_i(t) = [t^2 \ t \ 1] \frac{1}{2} \begin{bmatrix} 1 & -2 & 1 \\ -2 & 2 & 0 \\ 1 & 1 & 0 \end{bmatrix} \begin{bmatrix} p_i \\ p_{i-1} \\ p_{i+2} \end{bmatrix},$$

and uniform cubic splines by $$C_i(t) = [t^3 \ t^2 \ t \ 1] \frac{1}{6} \begin{bmatrix} -1 & 3 & -3 & 1 \\ 3 & -6 & 3 & 0 \\ -3 & 0 & 3 & 0 \\ 1 & 4 & 1 & 0 \end{bmatrix} \begin{bmatrix} p_i \\ p_{i+1} \\ p_{i+2} \\ p_{i+3} \end{bmatrix}.$$

The B-spline surfaces may be generated by blending a mesh of B-splines using the blending function $$Q(s, t) = \sum_{j=0}^{m} \sum_{k=0}^{n} P_{j,k} b_{j,p}(s) b_{k,q}(t),$$

where $P_{j,k}$ are locations of knots in space. A B-spline surface may also be interpreted as the surface area traversed by the curve of a moving B-spline that may change shape during the movement. The convex hull property of B-splines may also hold for B-spline surfaces.

In matrix notation, the B-spline surfaces may be calculated for the matrix G of control points by $$Q(s, t) = \begin{pmatrix} q_x(s, t) \\ q_y(s, t) \\ q_z(s, t) \end{pmatrix} = \vec{s} \cdot M \cdot G \cdot M^T \cdot \vec{t}^T$$

where the vectors $\vec{s}$ and $\vec{t}$ denote the position for interpolation of a data point, such as for cubic interpolation:

$$\vec{s} = \begin{pmatrix} s^3 \\ s^2 \\ s \\ 1 \end{pmatrix} \text{ and } \vec{t} = \begin{pmatrix} t^3 \\ t^2 \\ t \\ 1 \end{pmatrix}.$$

The parameter M denotes the interpolation matrix given by the interpolation based on B-splines, such as $$M = \frac{1}{6}\begin{pmatrix} -1 & 3 & -3 & 1 \\ 3 & -6 & 3 & 0 \\ -3 & 0 & 3 & 0 \\ 1 & 4 & 1 & 0 \end{pmatrix}$$

for cubic interpolation.

The resolution of the three-dimensional B-spline surfaces, $s_{j+1}-s_j$ (=0, . . . , l-1) and $t_{i+1}-t_i$ (i=0, . . . , m-1), respectively, may be manually selected. Alternatively or in addition to manual selection, the process 200 may automatically adjust the resolution. An automatic adjustment may be made by a computer that may process data associated with a physical terrain or other considerations. For example, the process 200 may automatically adjust the resolution to accommodate the available memory and/or processing capabilities of available computer resources. The process 200 may consider a desired level of detail for which the physical terrain will be modeled and/or the type of terrain to be modeled in adjusting the resolution.

The calculated B-spline surfaces may be uniform quadratic or uniform cubic B-spline surfaces based on uniform quadratic or uniform cubic B-splines, respectively. The blending function may be pre-calculated for the uniform quadratic and/or uniform cubic B-spline surfaces. The uniform quadratic and/or uniform cubic B-splines may be calculated numerically.

Additionally, or alternatively, the process 200 may use non-uniform B-spline surfaces. The B-spline surfaces may be non-uniform rational B-spline surfaces ("NURBS"), such as cubic NURBS or NURBS of fourth order. The control points associated with a NURBS curve may include a weight as a fourth coordinate. NURBS may accordingly represent curves and/or a surface in four-dimensional space.

In using NURBS, the process 200 may provide invariance under affine and perspective transformations, as well as a flexibility to match a variety of shapes. In addition, use of NURBS may minimize memory consumption when storing the B-spline surfaces in a memory.

Calculation of the B-spline surfaces for digital representation of the physical terrain may be performed rapidly to provide a visual output. B-splines may allow the local behavior of the curves comprised in the B-spline surfaces to change by manipulating one or more control points. B-spline surfaces may allow a more rounded terrain profile to be digitally represented as compared to the usage of standard polygons.

When generating the three-dimensional B-spline surfaces through interpolation of the identified raster points or through the coordinates of the identified raster points, the process 200 may provide variable resolution. The resolution of the physical terrain may be adapted according to data storage capacities and the processor load. The digital display resolution of the physical terrain based on the B-spline surfaces may be adaptively selected. Even for a relatively low-resolution, the process 200 allows for accurate terrain modeling.

The process 200 may display the calculated B-spline surfaces (Act 208). The calculated B-spline surfaces may be stored in a memory or transmitted to a visual output such as a display system. The B-spline surfaces may be displayed as a three-dimensional map on a display device. The display device may be a part of a handheld, desktop, vehicle-mounted device, and/or other device that uses and displays maps and other terrain information. The process 200 may display the digital representation of the physical terrain on an additional display layer that may be partly superimposed over a two-dimensional map.

Figure 3:
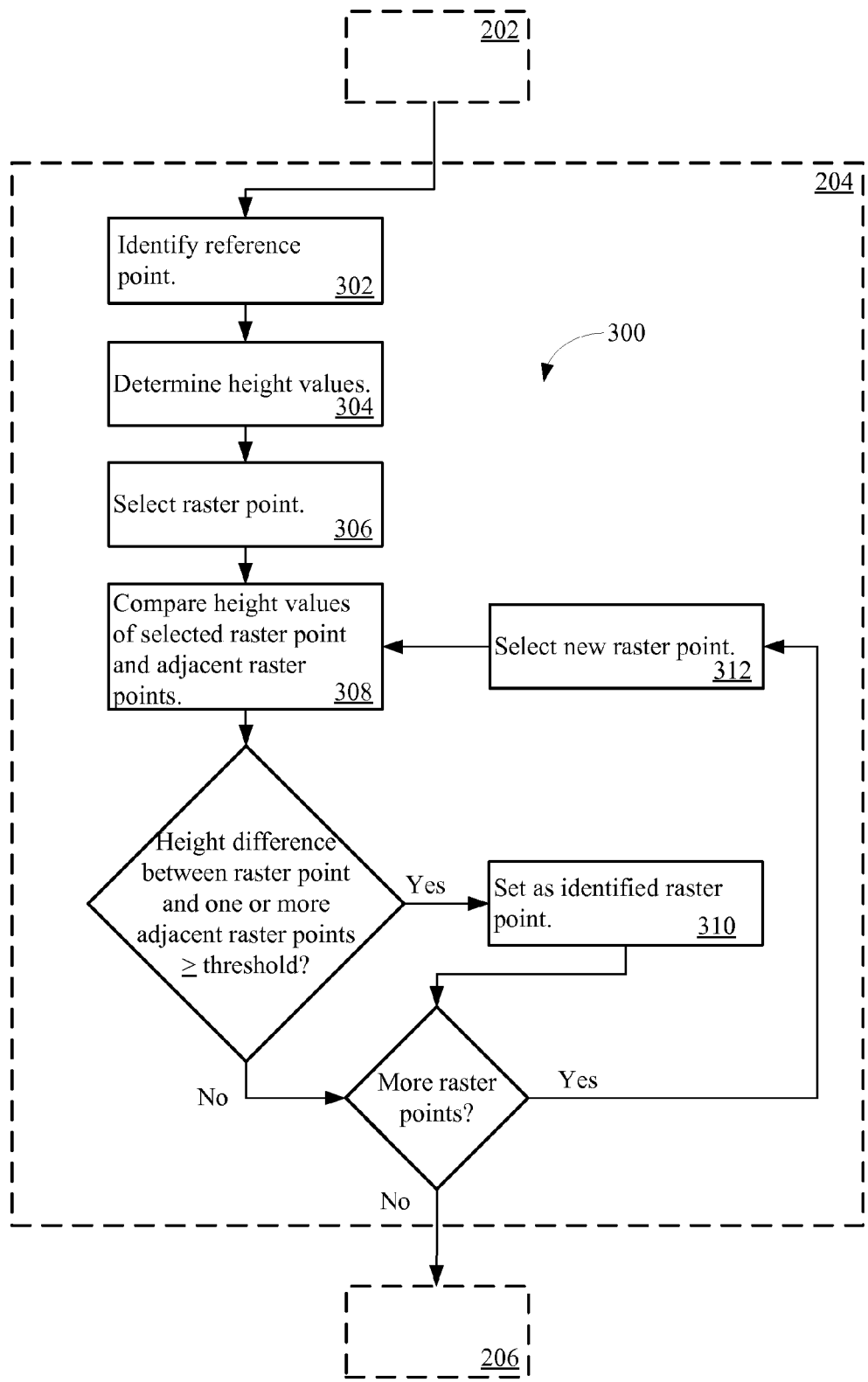
FIG. 3 is an exemplary terrain mapping process that may reduce the number of raster points.

FIG. 3 is an exemplary process 300 that may reduce the number of raster points to be processed (Act 204 of FIG. 2). The process 300 may identify a reference point (Act 302). One of the raster points of the input terrain model may be selected as the reference point. In an example, the process 300 may identify the lowest raster point as the reference point. The lowest raster point may be determined through analysis of associated height coordinates.

The process 300 may determine height values associated with the raster points of the input terrain model (Act 304). The height values may be determined and expressed relative to the reference point. The process 300 may normalize the height value of the reference point to zero and, when the reference point is the lowest raster point, express the height values of the raster points as a positive difference relative to the reference point.

The process 300 may select a raster point of the input terrain model (Act 306). The process 300 may compare the height value of the selected raster point with the respective height values of each raster points adjacent to the selected raster point (Act 308). If the height difference between the selected raster point and at least one of its adjacent raster points by at least a difference threshold, the process 300 may designate the selected raster point as an identified raster point (Act 310). Designating the selected raster point as an identified raster point may include storing the selected raster point in a memory. Designating the selected raster point may include flagging or otherwise indicating that the selected raster point is an identified raster point. If there are more raster points of the input terrain model to be analyzed according to Acts 308-310, the process 300 may select a new raster point (Act 312) and perform the comparison step (Act 308) for the new selected raster point.

If the height difference between the raster point and one of its adjacent raster points does not equal or exceed the difference threshold, the process 300 may determine if there are more raster points of the input terrain model to be analyzed. If there are more raster points to be analyzed, the process 300 may select a new raster point of the input terrain model and repeat the comparison and identification steps (Acts 308-312) for each raster point, or a subset of the raster points. In an alternative, if the height difference between the raster point and one or more of its adjacent raster points does not equal or exceed the difference threshold, the process 300 may designate one of the compared raster points (from among the selected raster point and its adjacent raster points) as an identified raster point.

When each of the raster points, or each of a subset of the raster points, are analyzed to determine if the height of the raster point differs from its adjacent raster points by at least the difference threshold, the process 300 may proceed to the next step in the terrain modeling process (Act 206 in FIG. 2). The set of identified raster points may include raster points whose respective heights differ from at least one of its adjacent raster points by the difference threshold.

For example, if the height values at raster points $r_{u,v}$, $r_{u+1,v}$, $r_{u+2,v}$, $r_{u+3,v}$ (where the lower indices u and v represent planar coordinates, such as the geographical longitude and latitude) differ by some value below a difference threshold, the process designates one of the raster points, such as $r_{u,v}$, as an identified raster point. Accordingly, the identified raster points may represent the set of raster points of the input terrain model that are relevant for the accurate modeling of the height profile of the physical terrain. The process 300 may store the identified raster point and its height value in a memory. Though this process, the demand for storage capacities may be reduced relative to the input terrain model originally obtained by the process 200.

The difference threshold may be approximately zero. When the difference threshold is approximately zero, the set of identified raster points includes raster points whose respective heights are not equal to the height of one or more of its adjacent raster points. The difference threshold may be a constant real number. The difference threshold may alternatively be represented by a percentage of a height difference between the raster point and the respective height values of the adjacent raster points, or by a percentage of a height difference between the height values of the lowest and the highest raster points. In another example, the difference threshold may be a percentage of the height value of the lowest or the highest raster point. The difference threshold may be represented with other data types that the process 300 may use to determine to reduce the raster points of the input terrain model to a set of identified raster points.

Figure 4:
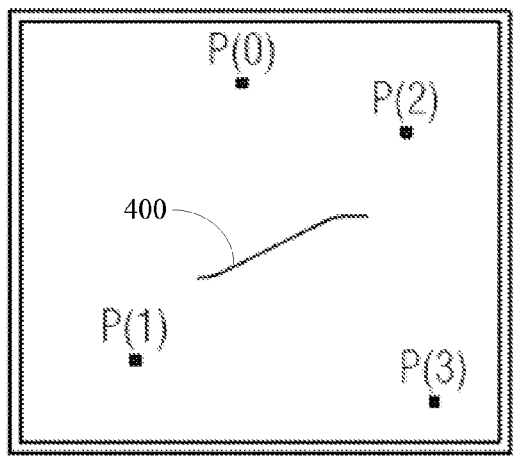
FIG. 4 is an exemplary uniform B-spline.
Figure 5:
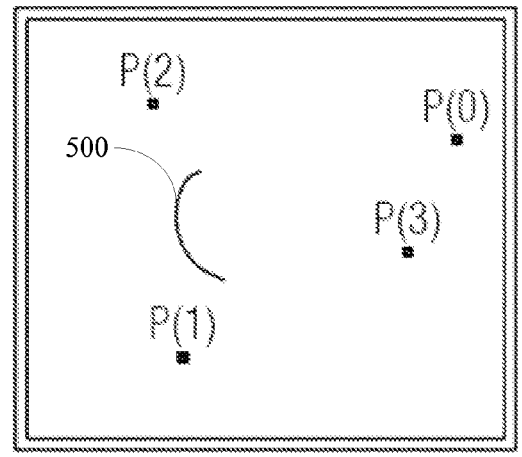
FIG. 5 is a second exemplary uniform B-spline.
Figure 6:
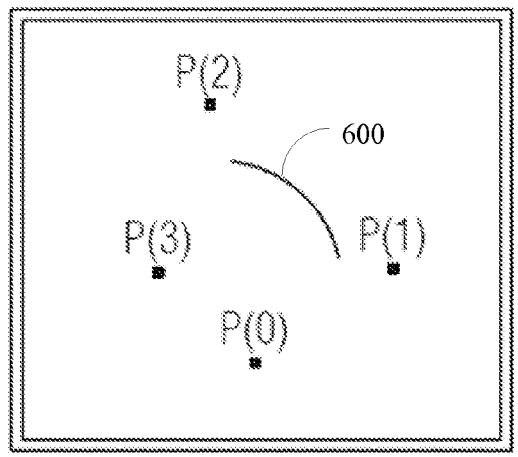
FIG. 6 is a third exemplary uniform B-spline.

FIGS. 4-6 each show an exemplary uniform B-spline 400, 500, and 600. Each B-spline 400, 500, and 600 includes four control points P(0)-P(3). The curves defined by B-splines 400, 500, and 600, as well as B-spline surfaces, $$C(t) = \sum_{i=1}^{m} P_i b_{i,n}(t)$$

and $$Q(s, t) = \sum_{j=0}^{m} \sum_{k=0}^{n} P_{j,k} b_{j,p}(s) b_{k,q}(t),$$

respectively, may be locally controlled by the respective control points P(0)-P(3). Each control point P(0)-P(3) influences the part of the curve nearest to it and may have little or no effect on parts of the curve that are farther away.

Figure 7:
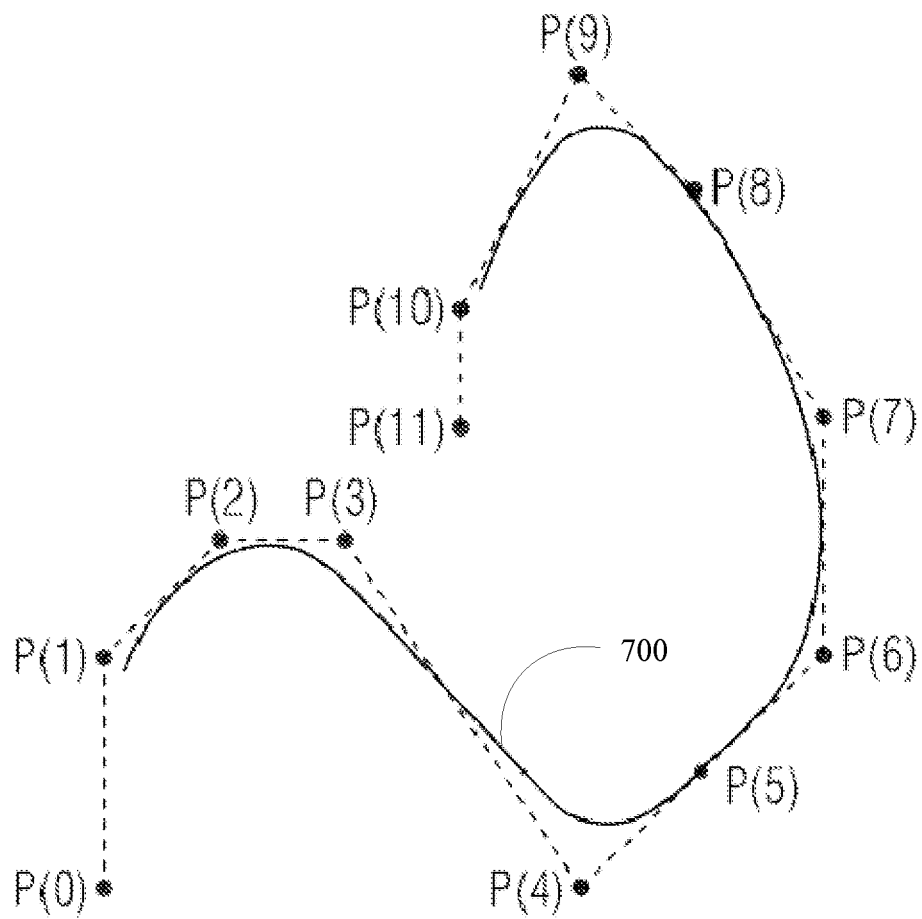
FIG. 7 is an exemplary B-spline curve comprising twelve control points.
Figure 8:
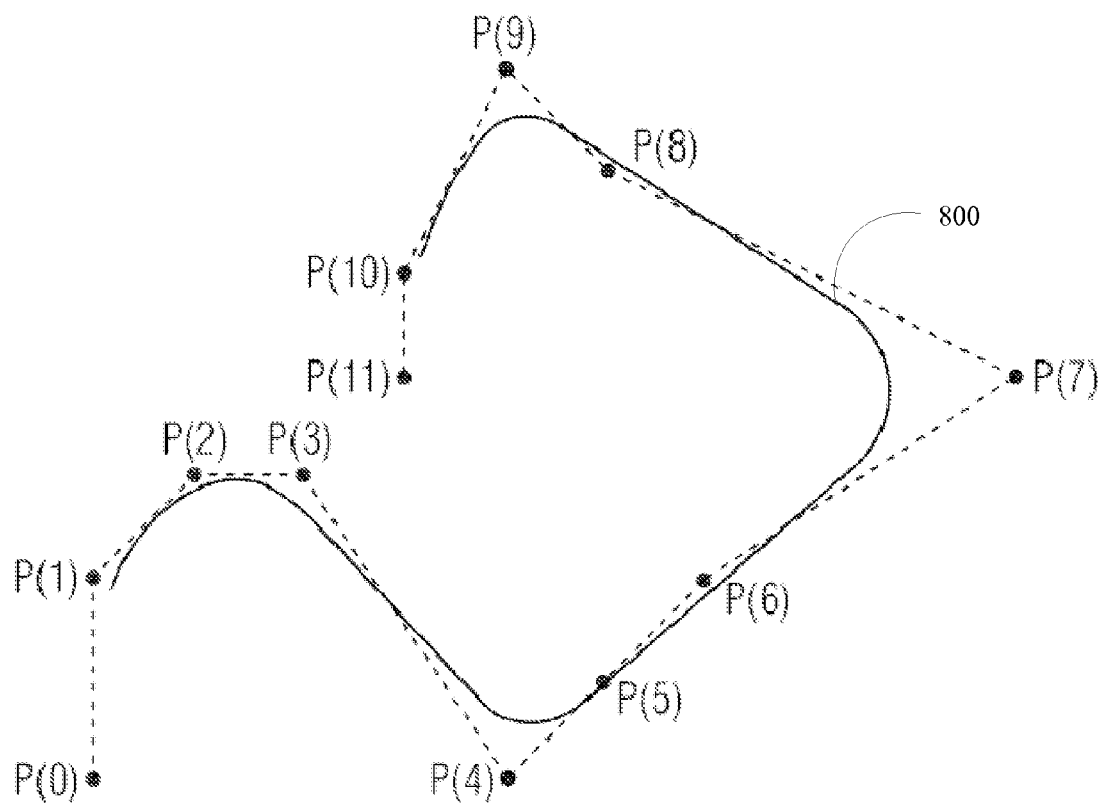
FIG. 8 is a second exemplary B-spline curve comprising twelve control points.

FIGS. 7 and 8 each show an exemplary B-spline curve 700 and 800 defined by twelve control points P(0)-P(11). Connections between the control points P(0)-P(11) are shown in FIGS. 7 and 8 for illustration purposes. The curves 700 and 800 differ from each other due to the relative positions of control point P(7), illustrating the local influence of control points on the curves 700 and 800.

The respective shapes of the curves 400, 500, 600, 700, and 800 shown in FIGS. 4-8 may be determined by the positions of the control points in the plane including the curve. The respective shapes of the curves 400, 500, 600, 700, and 800 may be determined by a projection from a four-dimensional space given by the coordinates of the control points and an additional weight coordinate associated with each control point.

Figure 9:
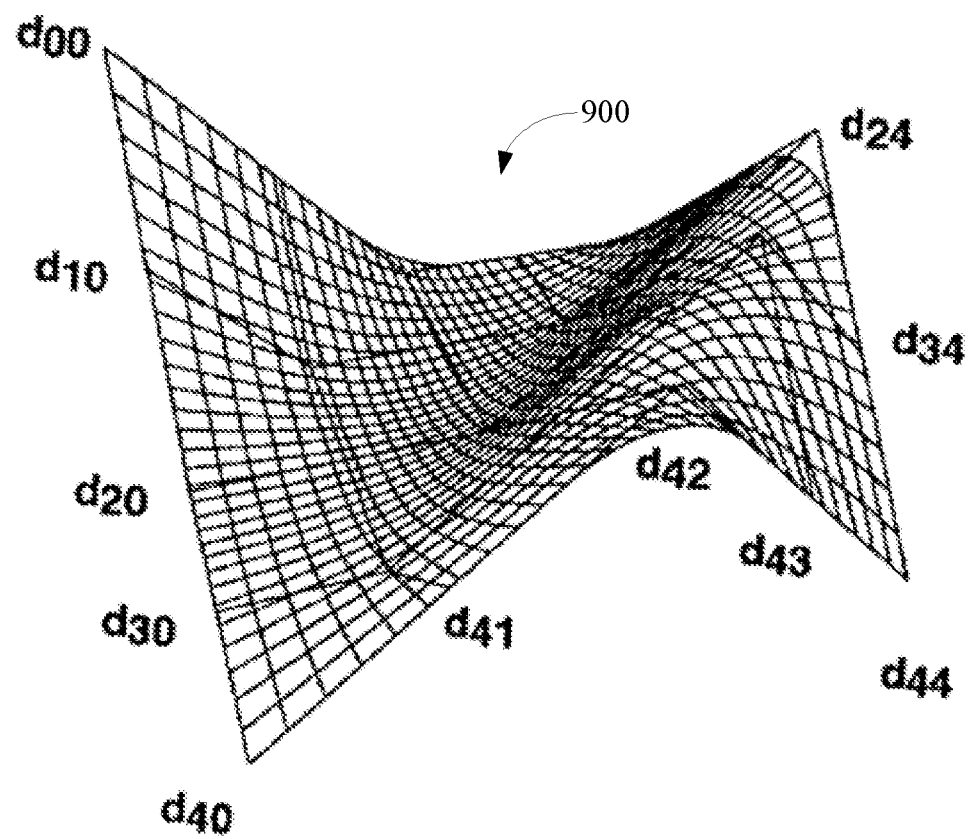
FIG. 9 is an exemplary B-spline surface.

FIG. 9 is an exemplary B-spline surface 900 with a control grid defined by 5×5 control points. The control grid represents a visualization of lines, such as a control polygon, connecting the control points. The values $d_{00}$-$d_{xy}$, where "x" and "y" equal four with respect to the B-spline surface 900, may correspond to height coordinates of the control points of the B-spline surface 900. Each control point may be given a weight through the basis functions $b_{j,p}(s)$ and $b_{k,q}(t)$, where the parameters "s" and "t" are discrete parameters with values $s_1, s_2, \ldots s_l$ and $t_1, t_2, \ldots, t_m$, respectively. The spatial resolution $s_{j+1}-s_j$ (j=0, ..., l-1) and $t_{i+1}-t_i$ (i=0, ..., m-1), respectively, may be selected, such that a three-dimensional digital representation of a physical terrain is generated. The spatial resolution may be generated to a desired or pre-determined accurateness of the digital representation, the available computer resources, or other considerations.

Figure 10:
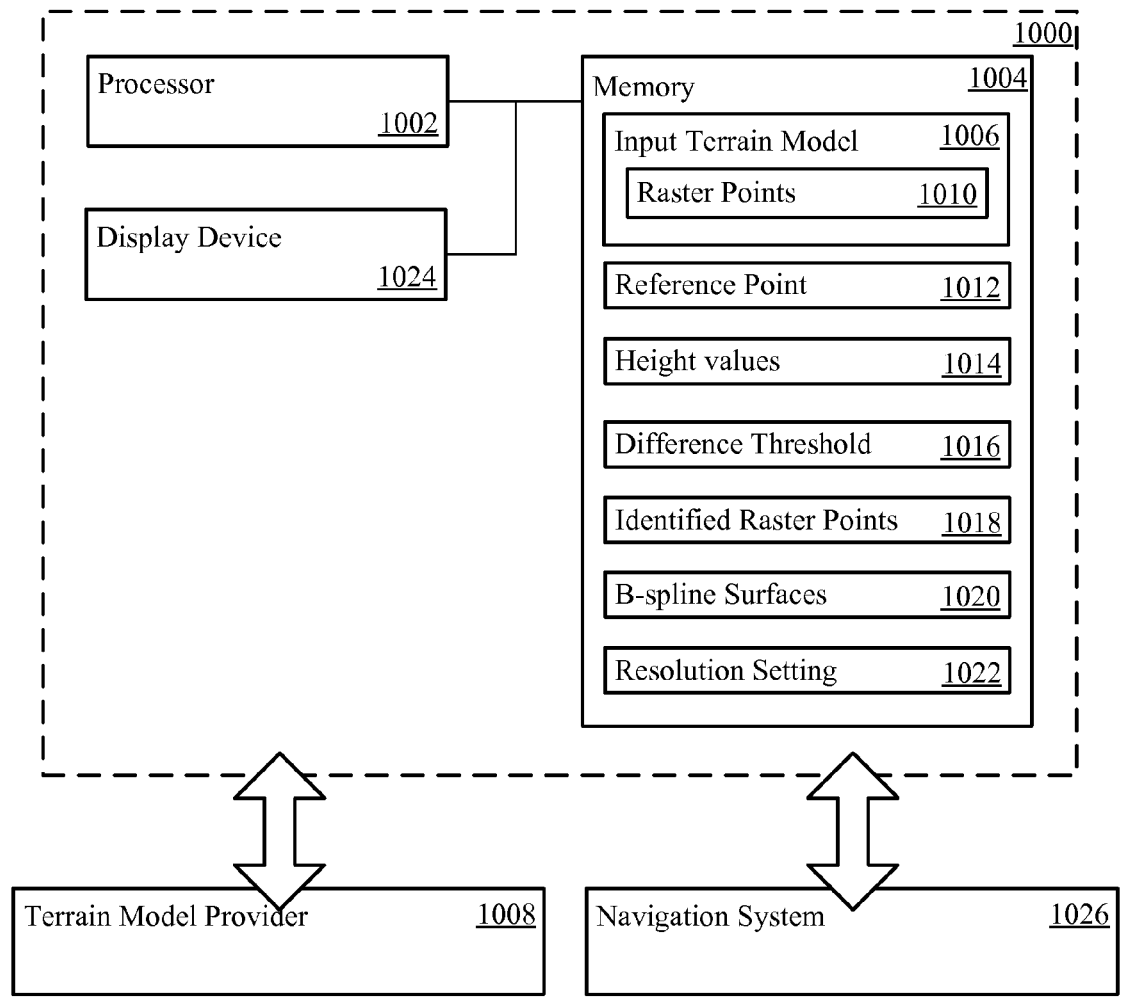
FIG. 10 is an exemplary terrain modeling system.

FIG. 10 is an exemplary terrain modeling system 1000 including a processor 1002 and a memory 1004. The processor 1002 may execute instructions stored in the memory 1004 to control operation of the terrain modeling system 1000.

Although selected aspects, features, or components of the implementations are depicted as being stored the memory 1004, all or part of the systems, including the methods and/or instructions for performing such methods consistent with the terrain modeling system 1000, may be stored on, distributed across, or read from other computer-readable media, for example, secondary storage devices such as hard disks, floppy disks, and CD-ROMs; a signal received from a network; or other forms of ROM or RAM either currently known or later developed.

Specific components of the terrain modeling system 1000 may include additional or different components. The processor 1002 may be implemented as a microprocessor, microcontroller, application specific integrated circuit (ASIC), discrete logic, or a combination of other types of circuits or logic. Similarly, the memory 1004 may be DRAM, SRAM, Flash, or any other type of memory. Parameters (e.g., raster points), databases, and other data structures may be separately stored and managed, may be incorporated into a single memory or database, or may be logically and physically organized in many different ways. Programs, processes, and instruction sets may be parts of a single program, separate programs, or distributed across several memories and processors.

The processor 1002 may obtain a terrain model as an input terrain model 1006 from a terrain model provider 1008. The terrain model provider 1008 may comprise a government, commercial, public, or other institution that generates and/or provides terrain models. The processor 1002 may read the input terrain model 1006 from one or more storage devices associated with the terrain model provider, such as from hard disks, floppy disks, DVDs, CD-ROMs, or other forms of ROM or RAM either currently known or later developed. The input terrain model 1006 may be a signal received from a network. The memory 1004 may store the input terrain model 1006.

The input terrain model 1006 includes raster points 1010 characterized by three-dimensional coordinate values. The processor 1002 may execute instructions stored on the memory 1004 to identify a reference point 1012. The reference point 1012 may be identified as the lowest raster point from among the raster points 1010. The memory 1004 may store the reference point 1012.

The processor 1002 may execute instructions stored on the memory 1004 to determine height values 1014 associated with each raster point 1010. The memory 1004 may store the height values 1014. The height values 1014 may be determined and expressed relative to the reference point 1012. In the example in which the reference value 1012 corresponds to the lowest raster point from among the raster points 1010, the reference value 1012 may be normalized to zero and the height values 1014 expressed as positive differences to the reference point 1012.

The memory 1004 may store a difference threshold 1016. The processor 1002 may execute instructions stored on the memory 1004 to determine a set of identified raster points 1018. The processor 1002 may designate an identified raster point 1018 as a raster point 1010 whose height value 1014 differs from the height value 1014 of one or more of its adjacent raster points 1010 by the difference threshold 1016. The set of identified raster points 1018 may be a subset of the raster points 1010 of the input terrain model 1006 whose respective height values differ from the height values of their respective adjacent raster points by the difference threshold 1016. When the processor 1002 designates one of the raster points 1010 as an identified raster point, the processor 1002 may cause the identified raster point 1018 to be stored on the memory 1004.

The processor 1002 may execute instructions stored on the memory 1004 to calculate three-dimensional B-spline surfaces 1020 by interpolating the identified raster points 1018. The memory 1004 may store the calculated B-spline surfaces 1020. The identified raster points 1018 may be the control points of the B-spline surfaces 1020. The memory 1004 may store a resolution setting 1022 associated with the B-spline surfaces 1020. The resolution setting 1022 corresponds to a resolution of knots between the identified raster points 1018. The resolution setting 1022 may comprise a variable resolution selected manually or automatically based on a memory capacity, processor load, a desired accurateness of the B-splines, and/or other considerations. A processor 1002 may execute instructions stored on the memory 1004 to automatically adjust the resolution to accommodate the available memory and/or processing capabilities of available computer resources. The B-spline surfaces 1020 represent an optimized digital representation of the physical terrain modeled by the input terrain model that provides, for example, adaptable resolution along with efficient use of computer resources.

The processor 1002 may execute instructions stored on the memory 1004 to display the B-spline surfaces 1020. The terrain modeling system 1000 may include a display device 1024 that displays the B-spline surfaces 1020. The display device 1024 may be a part of a handheld, desktop, vehicle-mounted device, and/or other device that visually presents information. As an alternative, the processor 1002 may execute instructions stored on the memory 1004 to provide the B-spline surfaces 1020 to a navigation system 1026 or other system that uses digital representations of topographical surfaces. The processor 1002 may provide the B-spline surfaces 1020 to the navigation system 1026 though a wired or wireless connection, or over a communications network. The processor 1002 may upload the B-spline surfaces 1020 to an online database, Web-page, or other source that may be accessed by the navigation system 1026. The B-spline surfaces 1020 may be provided to the navigation system 1026, or to other systems, on other computer-readable media, for example, secondary storage devices such as hard disks, floppy disks, and CD-ROMs, or other forms of ROM or RAM either currently known or later developed.

Figure 11:
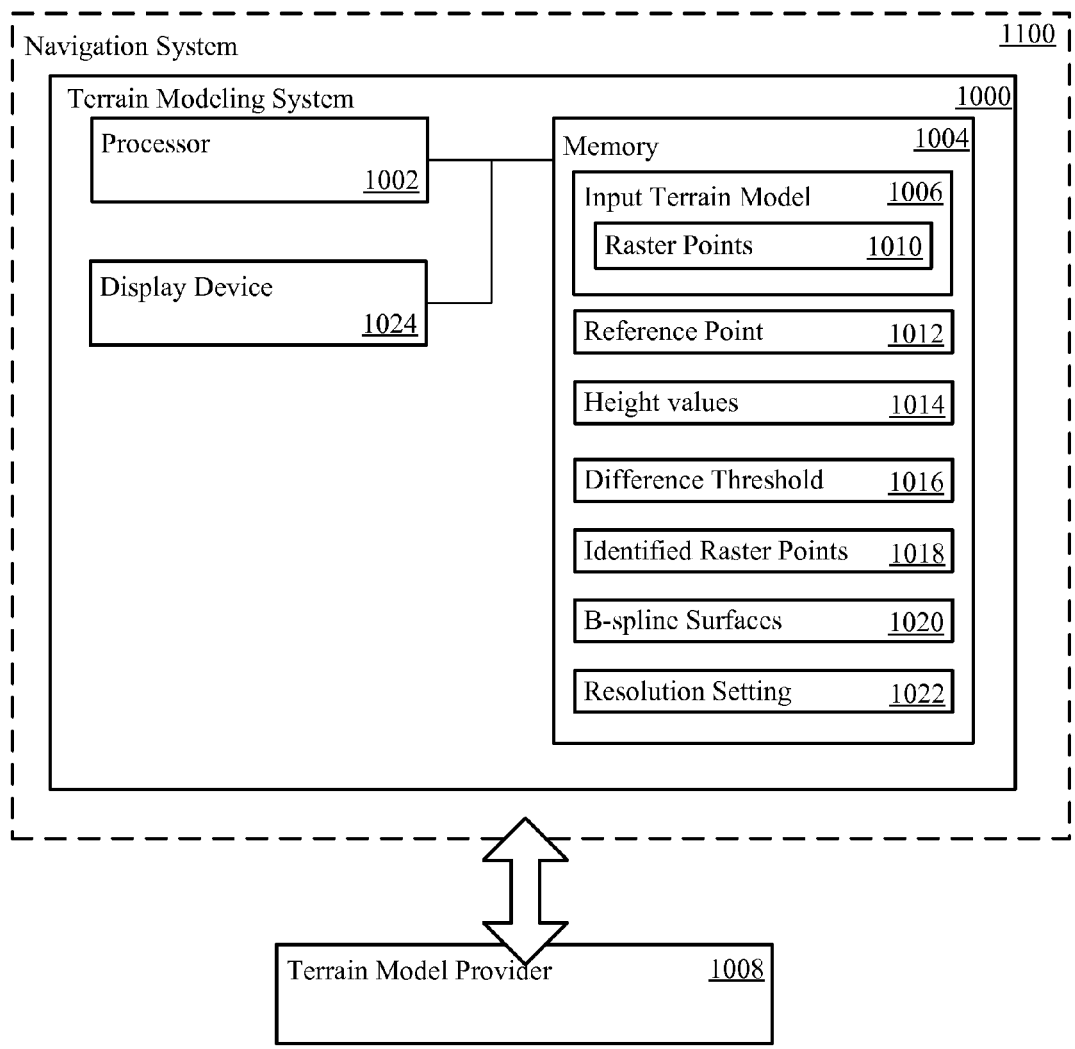
FIG. 11 is a navigation system implementing a terrain modeling system.

FIG. 11 is a navigation system 1100 implementing a terrain modeling system, such as the terrain modeling system 1000. The navigation system 1100 may comprise a handheld, vehicle, or other navigation system that provides, uses, and/or displays terrain information, such as for providing mapping and direction information to users. The navigation system 1100 may receive the input terrain model from the terrain model provider 1008.

The navigation system 1100 may retain, in addition to the B-spline surfaces calculated by and received from the terrain modeling system 1000, navigation data, such as information related to streets, lanes, traffic signs, crossing views, buildings, topographical data, geographic data, or other data related to navigation through a city, state or province, country, or other geographic region. The navigation system 1100 may also include position data corresponding to spatial coordinates of a vehicle, handheld device, or other system implementing the navigation system 1100. The navigation system 1100 may display the calculated B-spline surfaces 1020 in consideration of the spatial coordinates. The calculated B-spline surfaces 1020 may be displayed as a three-dimensional map. As an alternative, the calculated B-spline surfaces 1020 may be superimposed over a displayed two-dimensional map.

The disclosed methods, processes, programs, and/or instructions may be encoded in a signal bearing medium, a computer-readable medium such as a memory, programmed within a device such as on one or more integrated circuits, or processed by a controller or a computer. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as an analog electrical, audio, or video signal. The software may be embodied in any computer-readable or signal-bearing medium for use by, or in connection with, an instruction executable system, apparatus, or device. Such a system may include a computer-based system, a processor-containing system, or another system that may selectively fetch instructions from an instruction-executable system, apparatus, or device that may also execute instructions.

A "computer-readable medium," "machine-readable medium," "propagated-signal medium," and/or "signal-bearing medium" may comprise any means that contains, stores, communicates, propagates, or transports software for use by or in connection with an instruction-executable system, apparatus, or device. The computer-readable medium may selectively be, but not limited to, an electronic, magnetic, optical, electromagnetic, infrared, or semiconductor system, apparatus, device, or propagation medium. A non-exhaustive list of examples of a computer-readable medium include: an electrical connection "electronic" having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A computer-readable medium may also include a tangible medium upon which software is printed, as the software may be electronically stored as an image or in another format (e.g., through an optical scan), then compiled and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for terrain modeling, comprising:
providing a mobile unit for storing and receiving terrain model information, the mobile unit:
obtaining an input terrain model comprising raster points;
obtaining a height value associated with each raster point;
identifying raster points, from among the raster points of the input terrain model, with height values that differ from the height value of an adjacent raster point by a difference threshold;
interpolating the identified raster points to generate a multi-dimensional B-spline surface;
automatically selecting the resolution of the multi-dimensional B-spline surface based on the available storage capacity of the mobile unit; and
outputting the multi-dimensional B-spline surface.

2. The method of claim 1, further comprising identifying a reference point characterized by a reference height coordinate, where the height value associated with each raster point comprises a difference between a height coordinate of the raster point and the reference height coordinate.

3. The method of claim 2, where identifying a reference point comprises:
identifying a lowest raster point from among the raster points of the input terrain model;
identifying the lowest raster point as the reference point; and
normalizing the height value associated with the lowest reference point to zero.

4. The method of claim 1, further comprising displaying the multi-dimensional B-spline surface.

5. The method of claim 1, where the identified raster points comprise control points of the multi-dimensional B-spline surface.

6. The method of claim 1, where the identified raster points comprise a weight coordinate and where the multi-dimensional B-spline surface is a non-uniform B-spline surface.

7. The method of claim 1, further comprising storing the identified raster points in a memory.

8. A system for terrain modeling, the system comprising:
a mobile unit having a processor; and
a memory coupled to the processor, the memory comprising instructions that, when executed, cause the processor to:
obtain an input terrain model comprising raster points;
obtain a height value associated with each raster point;
store raster points, from among the raster points of the input terrain model, with height values that differ from the height value of an adjacent raster point by a difference threshold in the memory;
interpolate the stored raster points to generate a multi-dimensional B-spline surface;
automatically adjust the resolution of the B-spline surface based on an available storage capacity of the memory; and
output the multi-dimensional B-spline surface.

9. The system of claim 8, where the memory further comprises instructions that, when executed, cause the processor to automatically adjust the resolution of the B-spline surface based on an available storage capacity of the memory.

10. The system of claim 8, where the memory further comprises instructions that, when executed, cause the processor to:
receive a user input associated with a desired resolution; and
adjust the resolution of the multi-dimensional B-spline surface based on the user input.

11. The system of claim 8, where the memory further comprises instructions that, when executed, cause the processor to:
identify a lowest raster point and a highest raster point from among the raster points of the input terrain model; and
determine a height difference between the lowest and highest raster points, where the difference threshold comprises a percentage of the height difference between the lowest and highest raster points.

12. The system of claim 8, where the memory further comprises instructions that, when executed, cause the processor to identify a highest raster point from among the raster points of the input terrain model, where the difference threshold comprises a percentage of the height value associated with the highest raster points.

13. A product comprising:
a computer non-transitory readable medium; and
instructions stored on the medium that, when executed, cause a processor in a terrain modeling system to:
obtain an input terrain model comprising raster points;
obtain a height value associated with each raster point;
identify raster points, from among the raster points of the input terrain model, with height values that differ from the height value of an adjacent raster point by a difference threshold;
interpolate the identified raster points to generate a multi-dimensional B-spline surface;
automatically adjust the resolution of the multi-dimensional B-spline surface based on the available storage capacity of the readable medium; and
output the multi-dimensional B-spline surface.

14. The product of claim 13, where the identified raster points comprise control points of the multi-dimensional B-spline surface.

15. The product of claim 14, where the control points comprises a weight coordinate, and where the multi-dimensional B-spline surface represents a surface in four-dimensional space.

16. The product of claim 13, further comprising instructions stored on the medium that, when executed, cause the processor in a terrain modeling system to identify a reference point characterized by a reference height coordinate, where the height value associated with each raster point comprises a difference between a height coordinate of the raster point and the reference height coordinate.

17. The product of claim 16, where the instructions that, when executed, cause the processor to identify a reference point further cause the processor to:
identify a lowest raster point from among the raster points of the input terrain model;
identify the lowest raster point as the reference point; and
normalize the height value associated with the lowest reference point to zero.

18. A method for terrain modeling, the method comprising:
providing a mobile unit for storing and receiving terrain model information, the mobile unit:
obtaining an input terrain model comprising a first raster point and a second raster point, where the first raster point is adjacent to a first set of adjacent raster points and the second raster point is adjacent to a second set of adjacent raster points;

obtaining a first height value associated with the first raster point, a second height value associated with the second raster point, and a height value associated with each of the raster points of the first and second sets of adjacent raster points;

determining a difference between the first height value and the height values associated with the raster points of the first set of adjacent raster points;

determining a difference between the second height value and the height values associated with the raster points of the second set of adjacent raster points;

setting the first raster point as a first identified raster point if the difference between the first height value and the height value associated with at least one of the raster points of the first set of adjacent raster points is greater than or equal to a difference threshold;

setting the second raster point as a second identified raster point if the difference between the second height value and the height value associated with at least one of the raster points of the second set of adjacent raster points is greater than or equal to the difference threshold;

calculating a B-spline surface by interpolating the raster points set as identified raster points;

adjusting the resolution of the multi-dimensional B-spline surface automatically, based on an available storage capacity of the memory; and outputting the B-spline surface.

19. The method of claim 18, where setting the first raster point as a first identified raster point comprises storing the first raster point in a memory.

20. A navigation system comprising:
a processor;
a display device coupled to the processor; and
a memory coupled to the processor, the memory comprising:
  a digital terrain model comprising raster points; and
  instructions that, when executed, cause the processor to:
    obtain a height value associated with each raster point;
    store raster points, from among the raster points of the digital terrain model, with height values that differ from the height value of at least one adjacent raster point by at least a difference threshold in the memory;
    interpolate the stored raster points to generate a multi-dimensional B-spline surface;
    adjust the resolution of the multi-dimensional B-spline surface automatically based on an available storage capacity of the memory; and
    display the multi-dimensional B-spline surface on the display device.

21. The system of claim 20, the memory further comprising a reference point characterized by a height coordinate, where the height value associated with each raster point comprises a difference between a height coordinate of the raster point and the reference height coordinate.

22. The system of claim 20, the memory further comprising:
a resolution setting associated with a resolution of the multi-dimensional B-spline surface.

* * * * *

UNITED STATES PATENT AND TRADEMARK OFFICE
CERTIFICATE OF CORRECTION

| | |
|---|---|
| PATENT NO. | : 8,253,724 B2 |
| APPLICATION NO. | : 11/943892 |
| DATED | : August 28, 2012 |
| INVENTOR(S) | : Strassenburg-Kleciak et al. |

It is certified that error appears in the above-identified patent and that said Letters Patent is hereby corrected as shown below:

Col. 3, line 45, please amend the top line of the following equation that currently reads:

$$b_{I,0}(t) = \begin{cases} 1, & \text{if } t_I \leq t \leq t_{I-1} \\ 0, & \text{else} \end{cases}$$

To the correct equation of:

$$b_{i,0}(t) = \begin{cases} 1, & \text{if } t_i \leq t \leq t_{i+1} \\ 0, & \text{else} \end{cases}$$

Col. 5, line 10, " $\vec{S}$ and $\vec{t}$ " should be changed to " $\vec{s}$ and $\vec{t}$ "

Signed and Sealed this
Twenty-sixth Day of February, 2013

Teresa Stanek Rea
*Acting Director of the United States Patent and Trademark Office*